United States Patent
Shigyo et al.

(12)

(10) Patent No.: US 6,430,209 B1
(45) Date of Patent: Aug. 6, 2002

(54) SPREAD SPECTRUM COMMUNICATION APPARATUS

(75) Inventors: Masahiro Shigyo; Akihiro Matsubara, both of Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/245,320

(22) Filed: Feb. 5, 1999

(30) Foreign Application Priority Data

Feb. 6, 1998 (JP) .......................................... 10-025757

(51) Int. Cl.[7] ................................................ H04B 1/69
(52) U.S. Cl. ....................................... 375/130; 375/145
(58) Field of Search .................................. 375/130, 147, 375/142, 145, 152, 136, 316; 370/342, 335, 320

(56) References Cited

U.S. PATENT DOCUMENTS 5,737,329 A  *  4/1998  Horiguchi ................... 270/342
5,978,412 A  * 11/1999  Takai ........................... 375/130

FOREIGN PATENT DOCUMENTS

JP            63-250225          10/1988

* cited by examiner

*Primary Examiner*—Chi Pham
*Assistant Examiner*—Khai Tran
(74) *Attorney, Agent, or Firm*—Ratner & Prestia

(57) ABSTRACT

During a communication, when frame sync is lost in the receiver section of a spread spectrum communication apparatus, after the said sync is recovered, ID certification is practiced when the field intensity just before the loss is strong, or skipped when the said intensity is weak, and then the communication is resumed. Thus, the communication interrupt time due to the loss of sync is reduced.

5 Claims, 3 Drawing Sheets

US 6,430,209 B1

SPREAD SPECTRUM COMMUNICATION APPARATUS

FIELD OF THE INVENTION

The present invention relates in general to a spread spectrum communication apparatus including cordless telephones and portable transmitter/receiver, particularly employing the spread spectrum method, in which the receiver starts a communication with a certification process (an ID certifying) after the frame is synchronized. The apparatus have an improved frame re-synchronizing function in its receiver section for acquiring frame synchronization in the case of losing frame sync during a communication.

BACKGROUND OF THE INVENTION

Wireless communication apparatuses with the spread spectrum method have grown in interest in the recent years. Among the spread spectrum communications, a direct sequence method establishes a communication as follows: A transmitter multiplies information signals by a pseudorandom noise sequence(PN sequence), thereby spreading spectrum, then transmits the resultant signals. In a receiver, a PN sequence generator produces the PN sequence same as that of the transmitter, and the received signals are multiplied by the said PN sequence with the same timing as that of the transmitter for despreading spectrum, and thereby the information signals are reproduced. The timing of the produced PN sequence at the receiver should be adjusted to that of the PN sequence sent from the transmitter. This process of adjusting is called a frame-sync-acquisition process.

After this frame-sync-acquisition, an ID certifying process must be done before starting a communication. In the certification process, an ID (identifier) proper to the receiver should be identified with an ID carried by signals being received. When a communication is interrupted by losing synchronization of the generated PN sequence with that from the transmitter caused by any disturbance, the frame-sync-acquisition process must be performed in order to recover synchronization of the PN sequence. In this case, the ID certification is processed after the frame-sync-acquisition. When an ID is not certified, the step of frame-sync-acquisition process is started again, and repeated until ID is certified. After the ID certified, the communication can be resumed. This process from recovering the sync to resuming the communication is called a frame re-sync process.

The frame re-sync process demands a time for certifying an ID in addition to a time for the frame-sync-acquisition. In case that a frame-sync-acquisition method employing a sliding correlator is used, in particular, it takes rather long time to resume the communication if a frame synchronization would be lost due to some disturbance, because the sliding correlator is sliding a delay time of the generated PN sequence slightly step by step in order to search high correlation value made from a sum of products of a number of the PN sequence and a number of received spread signals. When this happens in a telephone apparatus for which a real time action is vital, communication quality is lowered by voice interruptions. The voice interruption time thus need to be reduced for upgrading communications.

SUMMARY OF THE INVENTION

The present invention addresses the problem discussed above and aims to provide a spread spectrum cordless telephone apparatus that can reduce a voice interruption time due to loss of synchronization caused by some disturbance.

In the spread spectrum communication, frame synchronization in a receiver is lost due to interference from the spread spectrum signal in the same frequency band and in the similar PN sequence. In this case, field intensity immediately before loss of synchronization is high. On the other hand, when synchronization is lost due to just noise interference, the field intensity immediately before the loss is low. Therefore, when the field intensity is high immediately before the sync is lost, the apparatus needs the ID certification to avoid receiving other spread spectrum signals from a similar communication system. However, when the field intensity is low immediately before the sync is lost, the apparatus seldom needs the ID certification because the loss has been probably caused by noise interference.

In order to achieve the objective of the present invention, the field intensity immediately before the loss of sync is stored, and when the stored intensity is high, the ID is desirably certified not to receive other spread spectrum signals which have probably interfered with the present communication. When the stored intensity is low, the communication is desirably resumed free from the ID certification in order to shorten a voice interruption time because only noises have probably interfered with the present communication.

The spread spectrum cordless telephone apparatus of the present invention has a structure that allows the apparatus to determine the necessity of the ID certification after frame-sync-acquisition by referring to the field intensity immediately before the sync is lost. The apparatus thus can determine to practice the step of the ID certification only when it is needed, or to skip this step responsive to an outer environment. As a result, this apparatus can reduce the waiting time before the communication is resumed.

DETAILED DESCRIPTION OF EXEMPLARY EMBODIMENT

Figure 1:
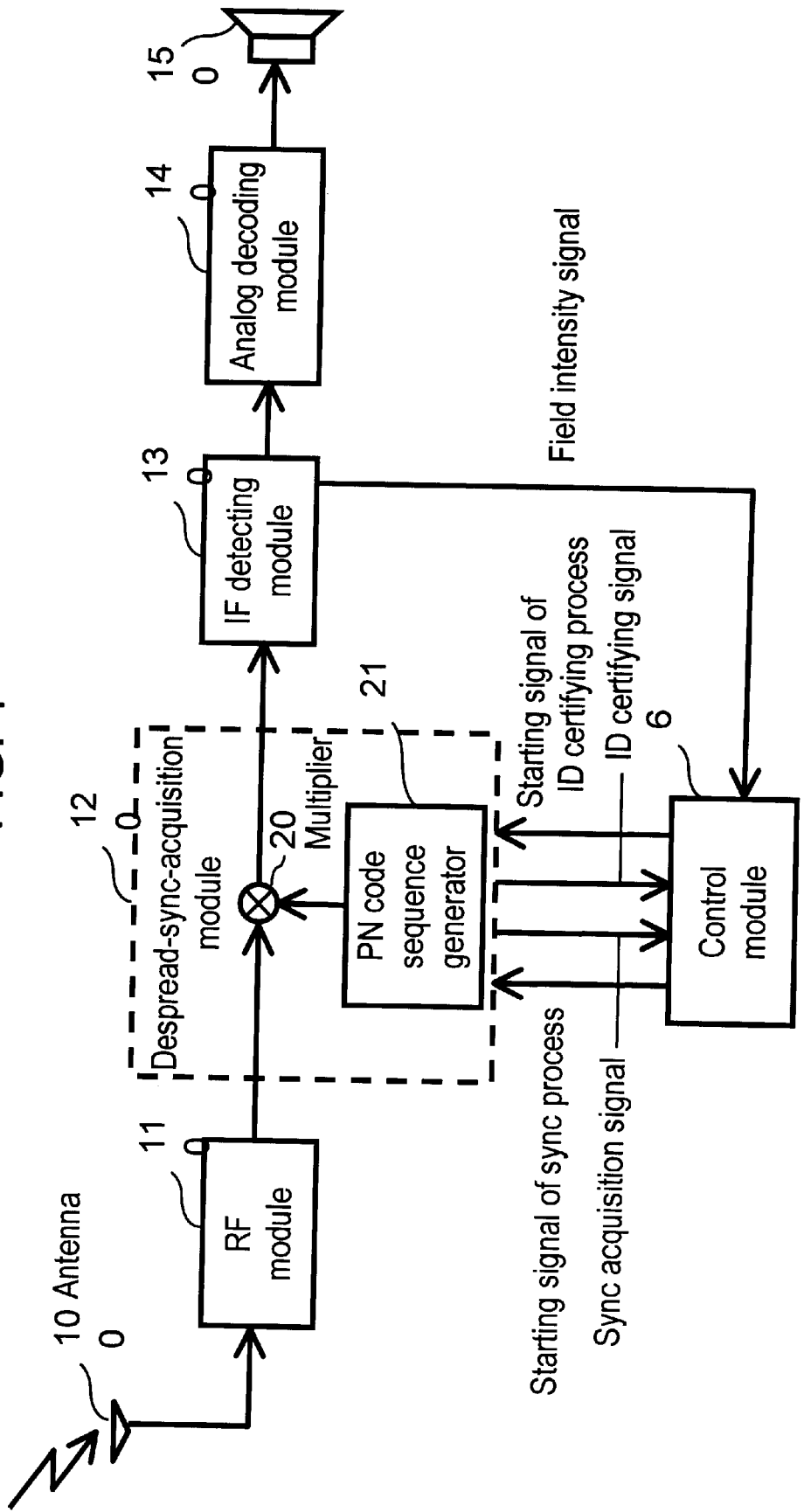
FIG. 1 is a block diagram illustrating a receiver of a spread spectrum cordless telephone apparatus in accordance with an exemplary embodiment of the present invention.
Figure 2:
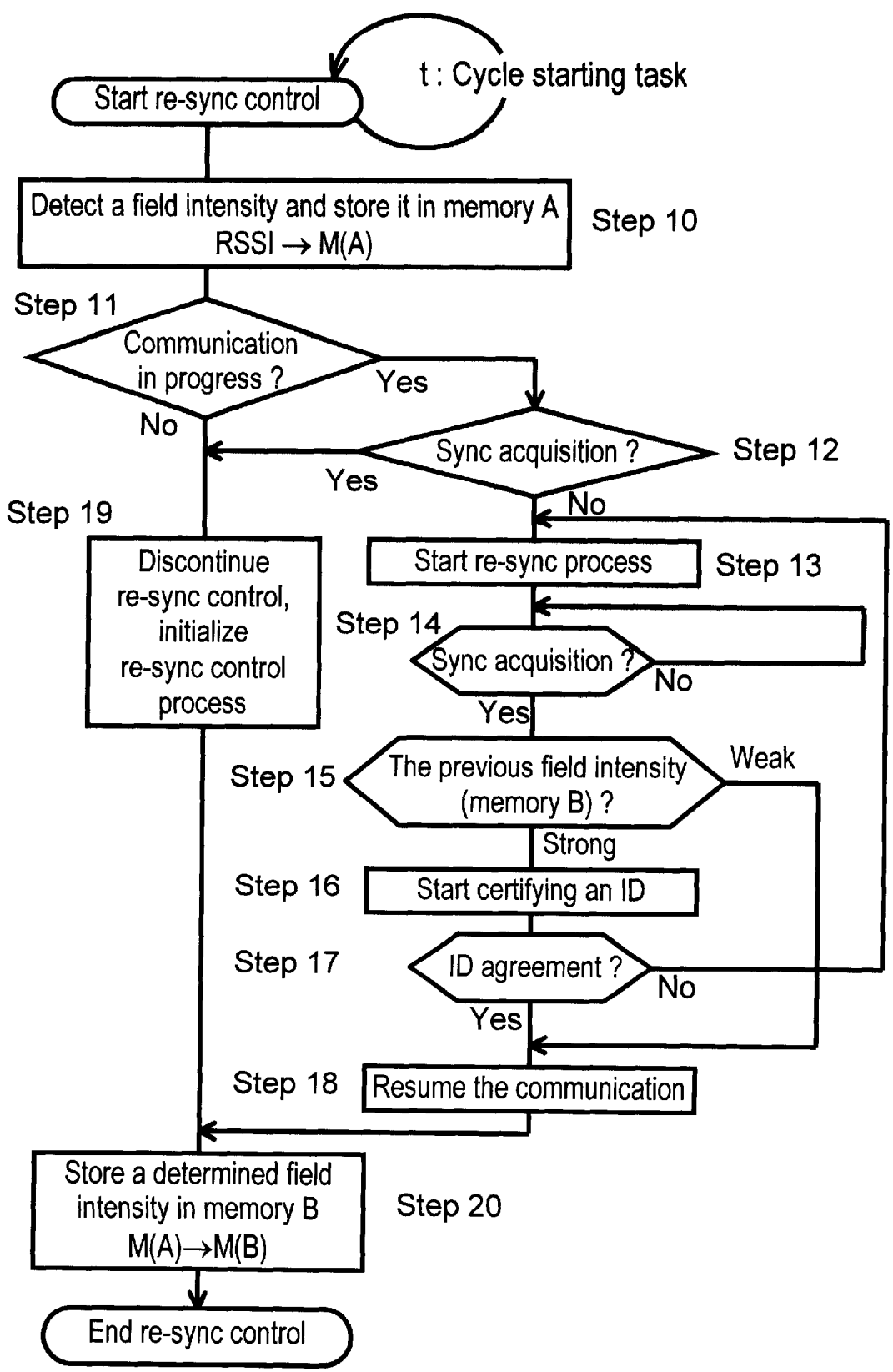
FIG. 2 is a flowchart depicting a control process of re-sync for overcoming the loss of sync, the process is practiced in a control module of the telephone apparatus of FIG. 1 during a communication.

FIG. 1 is a block diagram illustrating an interesting part of a receiver of a spread spectrum cordless telephone apparatus in accordance with an exemplary embodiment of the present invention. FIG. 2 is a flowchart depicting a re-sync control process overcoming a loss of sync, practiced in a control module of the telephone apparatus in FIG. 1 during a communication.

First, antenna 10 receives signals of wide band. Second, RF module 11 amplifies the signals and selects a frequency band thereof, then despread-sync-acquisition-module 12 provides the signals with a despreading process by multiplying a specific PN code sequence produced by PN-code-sequence-generator 21 incorporated in module 12. PN-code-sequence-generator 21 consists of shift registers with feedback of, for example, the "Exclusive-or" signal of a mid-stage output and the end-stage output signal to the input of $1^{st}$. stage, and generates PN code sequence defined to the apparatus. The multiplication is performed in multiplier 20. The PN code sequence has undergone frame-sync-acquisition in module 12 so that the sequence is timed to the signals received by antenna 10. The frame-sync-acquisition are set with adjusting the timings of the generated PN-code-sequence such that a correlation value becomes high by a correlator. At the sync acquisition, control module 6 receives a sync acquisition signal(sync lock signal) from module 12.

IF detecting module 13 amplifies the de-spread IF (intermediate frequency) carrier modulated signal, for example, at center frequency about 10 MHz with band width about 64 kHz, then, detects signal level indicating "field intensity voltage" from the average or nearly peak amplitude of the IF carrier signal and also demodulates the IF carrier modulated signal to reproduce information digital signals of base-band. The despread signals travel through IF (intermediate frequency) detecting module 13, and are decoded by analog decoding circuit module 14. When analog decoding circuit module 14 decodes, digital audio signals are reproduced, removing frame-construction signals for transmission from the information digital signals of base-band (refer item 3 in the above section), de-scrambled if the signals are scrambled, expanded when audio compression technique is used in the communication system, and then converted to analog audio signals. The waveforms of information signals of base-band are thus reproduced. The signals are then transmitted to speaker 15 where the signals are transformed into audio. During these processes, IF detecting module 13 sends signals of field intensity voltage (RSSI) to control module 6.

Figure 3:
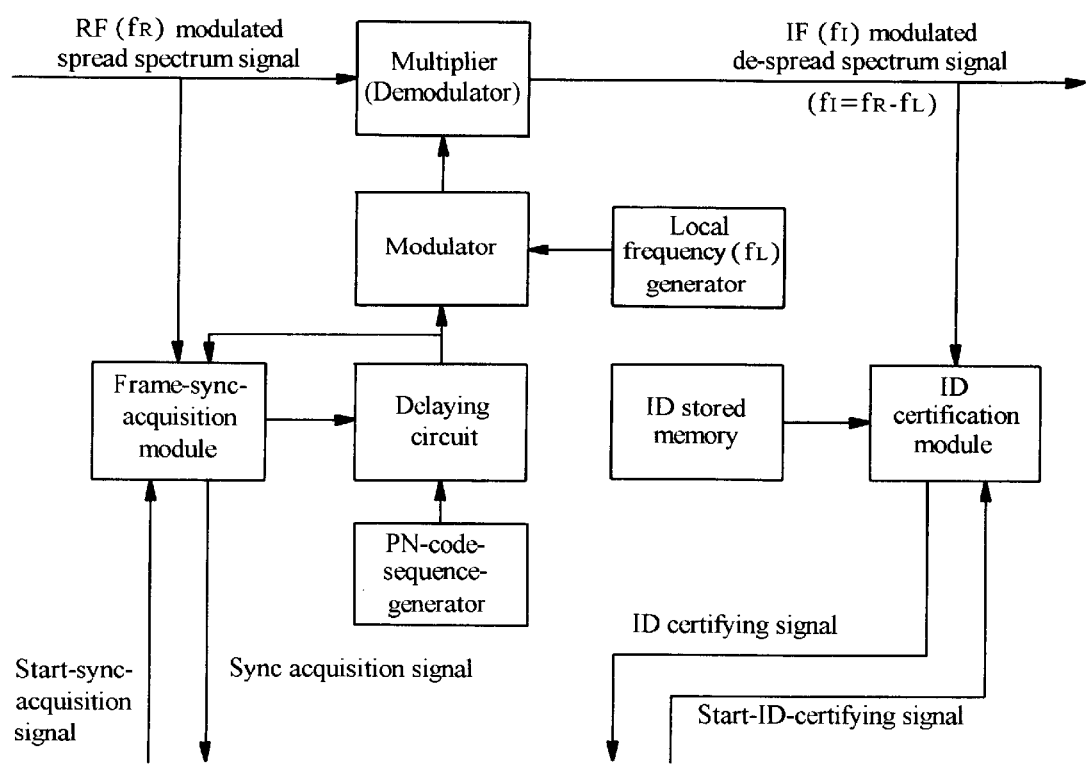
FIG. 3 is a block diagram of a despread-sync-acquisition-module.

A block diagram of despread-sync-acquisition-module 12 is shown in the FIG. 3. In Frame-sync-acquisition module, from received RF modulated spread signal, the base-band pulse sequence of the sync field in a frame is reproduced, and compared with the delayed pulses of the generated PN-code-sequence. Both the pulse sequences are multiplied (equivalent to be exclusive or-ed, then inverted) pulse by pulse, then the multiplied values are added through a period of the PN sequence. This added value shows the correlation of the both sequences. So, in case that this correlation exceed the pre-defined value, sync is determined to be acquired. Otherwise, the delaying time of the PN sequence is re-adjusted until the correlation reach the value (desirably the maximum).

When sync is acquired, the delaying time of the PN-code-sequence is fixed. At this moment, Sync acquisition signal make "on". This delaying time adjusted PN sequence is modulated with the generated Local frequency carrier of which frequency is determined to make the desired IF frequency (the difference between RF and Local frequency). The RF modulated spread spectrum signal that is the input of this module is multiplied (demodulated, accordingly de-spreaded) by this modulated PN sequence, and become the IF modulated de-spread signal as the output of this module.

The sync lock signal detects an abnormality of synchronization during a communication, then starts a frame re-sync process for recovering a sync again to despread spectrum. Detection of abnormality of synchronization during communication; means detection of the state of the sync acquisition signal being "off" (no). After the sync is recovered, the field intensity immediately before the loss of sync is referred. When the referred intensity is strong, it is determined that the sync is lost by interference from a similar signal. Then ID certifying process is driven whether the ID of the present apparatus agrees with the ID carried by the sync-recovered signal in order to identify the signal. The communication is resumed when both the IDs agree with each other. If both IDs fail to agree, the re-sync process is repeated until both the IDs agree with each other. When the determined field intensity is weak, the communication is resumed free from the ID certifying process.

As such the control module has various functions controlling the entire apparatus. A control over re-sync process related to the present invention is described hereinafter with reference to FIG. 2. The re-sync control process starts every given interval, and in step 10, every time it stores a present field-intensity gained from the IF detecting module into memory A. In step 11, the process determines whether a communication is in progress or not. When a communication is in progress, the process moves to step 12, where the process determines whether a sync acquisition signal supplied from a despread-sync-acquisition module is on(yes) or off(no). When the signal is off, the process moves to step 13, where the process instructs the despread-sync-acquisition module to start the frame-sync-acquisition process. In step 14, the process wait until a sync acquisition signal is on(yes) from the despread-sync-acquisition module, then the process in step 15 refers to memory B that has stored the field intensity before the loss of sync. ID certifying process starts in step 16 in order to recognize whether the ID of the signal locked by the sync is the ID of the present apparatus or not, only when the field intensity is strong. The ID certifying process is the process to recognize whether the ID data which is transmitted in the ID field of a frame with the information (in this case, audio) signal, for identifying the receiver, agrees with the ID data of the present apparatus, which is stored in a memory in the Despread-sync-acquisition-module 12 of FIG. 1. When all corresponding bits of both the ID data agree, the ID certifying signal becomes "on" and "the IDs agree?" is "yes" in step 17 in FIG. 2. When the IDs agree in step 17, the process moves to step 18 to resume the communication. If step 17 cannot find the agreement of IDs, the process returns to step 13 and repeats the processes from the re-sync process until the ID agreement is found. If cycles or a total time of the repeats exceeds a given value, a time-out process is practiced to discontinue the re-sync process, which is omitted from the flowchart in FIG. 2. In step 15 when the field intensity is weak, the sync is not probably lost by interferences from a similar communication system. The process then skips steps 16 and 17 (ID certifying steps), and resumes the communication in step 18. When step 12 finds a sync acquisition signal on, or step 11 finds the communication is not in progress, the process directly moves to step 19, where re-sync control process is initialized. If the re-sync process is in progress, it must be discontinued in order to prepare for the next re-sync control process.

Just before the entire process is completed, the content of memory A is transferred to memory B in order to update the data of field intensity that is utilized for determining the necessity of ID certifying step. Meanwhile, memory B is initialized with strong intensity before being used for the first communication.

According to the exemplary embodiment discussed above, when the field intensity (RSSI) is strong immediately before the sync is lost, another signal probably interferes with the present communication, therefore the ID certifying step is required. However, when the intensity is weak immediately before the loss of sync, only noises probably interfere with the communication, the ID certifying step thus can be omitted.

As discussed above, the spread spectrum cordless telephone apparatus of the present invention is required to undergo the step of certifying the ID of received signals, which is necessary for receiving spread spectrum signals, after the despreading sync acquisition. If sync is lost during a communication, resync process is required. In this case, the ID certifying step is practiced only when the step is determined to be necessary by referring to the field intensity (RSSI) immediately before the loss of sync. The apparatus of the present invention is thus provided with a function determining automatically the necessity of the ID certifying step responsive to an outer environment. As a result, a voice interruption time can be reduced.

What is claimed is:

1. A spread spectrum cordless telephone apparatus comprising:

sync-acquisition means including a sliding correlator for providing a despread spectrum sync; and a control means for controlling said sync-acquisition means, wherein said apparatus stores a field intensity before a sync of spread spectrum supplied from said sync-acquisition means is lost, wherein said apparatus practices an ID certification when the stored intensity is strong, or skips the ID certification when the stored intensity is weak, and wherein said apparatus resumes a communication after one of finding an agreement of IDs and skipping the ID certification.

2. A spread spectrum communication apparatus comprising:

(a) a sliding correlator for providing a despread spectrum sync;

(b) means for supplying a field intensity signal indicating a field intensity of a received signal;

(c) control means for practicing re-sync process for providing despread spectrum sync again when a sync abnormality is detected, wherein said control means practices an ID certifying step when a field intensity detected immediately before the sync has been lost is strong, wherein said control means skips the ID certifying step when the field intensity is weak, and wherein said control means resumes a communication after one of finding an agreement of IDs and skipping the ID certifying step.

3. The spread spectrum communication apparatus as defined in claim 2, wherein said means is an IF (intermediate frequency) detecting means for detecting an intermediate frequency signal from a signal produced by a despreading spectrum device and for supplying the field intensity signal indicating the field intensity of the received signal, wherein said apparatus further comprising:

(d) an analog decoding circuit module for decoding the intermediate frequency signal into an analog audio signal; and (e) a audio output device for converting the decoded signal to audio.

4. A spread spectrum communication apparatus comprising:

(a) a PN code sequence generator for despreading;

(b) means for supplying a field intensity signal indicating a field intensity of a received signal;

(c) control means for practicing re-sync process for providing sync again to despread spectrum when a sync abnormality is detected, wherein said control means practices an ID certifying step when the field intensity detected immediately before a sync has been lost is strong, wherein said control means skips the ID certifying step when the field intensity is weak, and wherein said control means resumes a communication after one of finding an agreement of IDs and skipping the ID certifying step.

5. A spread spectrum communication apparatus comprising:

(a) an antenna for receiving an input radio wave;

(b) an RF (radio frequency) module for amplifying a subtle signal received by said antenna;

(c) a sync acquisition module including a PN code sequence generator for despreading and a multiplier for multiplying the received signal by the PN code sequence;

(d) an IF (intermediate frequency) detecting means for detecting an IF and supplying a field intensity signal indicating a strength of the signal;

(e) an analog decoding circuit module for decoding the intermediate frequency signal into an analog audio signal;

(f) a audio output device for outputting the decoded signal as audio; and (g) a control module for practicing re-sync process for providing despread spectrum sync again when a sync abnormality is detected based on a signal supplied from said sync acquisition module, wherein said control module practices an ID certifying step when a field intensity detected immediately before a loss of sync is strong, wherein said control module skips the ID certifying step when the field intensity is weak, and wherein said control module resumes a communication after one of finding an agreement of IDs and skipping the ID certifying step.

* * * * *